(12) United States Patent
Hashimoto et al.

(10) Patent No.: US 6,335,828 B1
(45) Date of Patent: Jan. 1, 2002

(54) MICRO-LENS ARRAY SHEET

(75) Inventors: Takahiro Hashimoto; Tsutomu Sakamoto, both of Saitama-ken (JP)

(73) Assignee: Kabushiki Kaisha Toshiba, Kanagawa-ken (JP)

(*) Notice: Subject to any disclaimer, the term of this patent is extended or adjusted under 35 U.S.C. 154(b) by 0 days.

(21) Appl. No.: 09/426,860

(22) Filed: Oct. 26, 1999

(30) Foreign Application Priority Data

Oct. 26, 1998 (JP) .......................................... 10-304082

(51) Int. Cl.⁷ .......................... G03B 21/56; G03B 21/60
(52) U.S. Cl. ...................... 359/443; 359/451; 359/453; 359/454; 359/457; 359/459; 359/460
(58) Field of Search .................. 359/443, 451, 359/453, 454, 457, 459, 460, 628

(56) References Cited

U.S. PATENT DOCUMENTS 4,541,727 A * 9/1985 Rosenthal .................. 368/232
6,129,866 A * 10/2000 Hamanaka et al. .......... 264/1.7

FOREIGN PATENT DOCUMENTS

JP        10-39769        2/1998

* cited by examiner

Primary Examiner—Christopher E. Mahoney
Assistant Examiner—Magda Cruz
(74) Attorney, Agent, or Firm—Pillsbury Winthrop LLP

(57) ABSTRACT

A micro-lens array sheet having a wide field angle, a field angle control, a high light efficiency, a high brightness and a high contrast, which is provided with a layer of micro-lenses each shaped to be a centro-symmetry convex or concave micro-lens. A layer of either a light diffusion sheet or a sheet filled with light diffusive agent is attached on a light transmitting side of the micro-lens array sheet. The micro-lenses are aligned in a diamond grid array or an array including a combination of diamond-shape and hexagonal-shape micro-lens blocks.

11 Claims, 7 Drawing Sheets

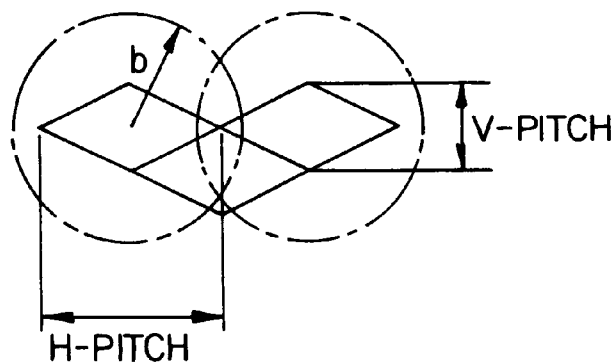
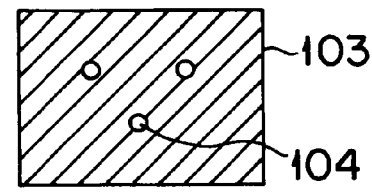
FIG. 3a  FIG. 3b
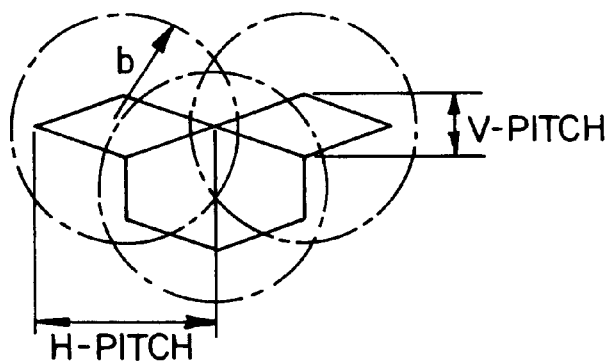
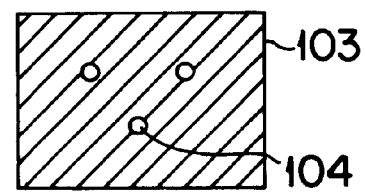
FIG. 4a  FIG. 4b

MICRO-LENS ARRAY SHEET

FIELD OF THE INVENTION

The present invention relates to a micro-lens array sheet which is useful for wide screen display apparatus of the rear projection type television.

BACKGROUND OF THE INVENTION

In prior arts, there are two types of screens for a LCD rear projection type television. One is a single-sided lenticular screen. The other is a double sided lenticular screen covered with black stripe coatings. They will be explained in detail hereinafter.

An example of the single-sided lenticular screen is explained.

FIG. 11a is a plan view showing the rear projection type display apparatus. A light with a field angle is projected from a projection lens 1 to a Fresnel lens sheet 2 where the light is converted into a parallel beam light. Then, the parallel beam light diffuses in the single-sided lenticular sheet 3, and it passes through the tint layer 6, so that the light 4 with a certain field angle forms an image in the viewer's eyes.

FIG. 11b is a perspective view showing the single-sided lenticular sheet 3, and FIG. 11c is a section of the single-sided lenticular sheet 3.

In the conventional single-sided lenticular sheet, the convex (or semi-cylindrical) lenses are formed in the vertical direction with respect to viewer's eye, as shown in FIG. 11b. The inside of the single-sided lenticular sheet is a plastic layer mixed with the light diffusive agent. The parallel incident light is launched into the convex lens, where the light is changed its direction and diffused by the light diffusive agent, so that the image is projected as the image emitting light with a certain field angle.

Here the convex lens is control the horizontal field angle, and the vertical field angle is depend on the light diffusion control of the light diffusive agent.

FIG. 12a is a plan view showing the double-sided lenticular screen covered with black stripe coatings. A light field angle is projected from the projection lens 10 to the Fresnel lens sheet 11 where the light is converted into the parallel beam light, then it is launched into the double-sided lenticular sheet 12. The light diffuses in the double-sided lenticular sheet 12, so that the light 14 with a certain field angle forms an image in the viewer's eyes.

FIG. 12b is a perspective view showing the double-sided lenticular sheet 12, and FIG. 12c is a section showing the double-sided lenticular sheet 12. The black stripe coatings (light shielding film) 13 enhance the contrast of the image by depressing the reflection of the extraneous light.

The double-sided lenticular sheet 12 has convex lenses on both sides, as shown in FIGS. 12b and 12c. The lenticular elements on the light incident side are shaped in stripes elongating in the direction vertical to the viewer's eyes. While the light emitting side of the sheet is covered with block stripe coatings (light shielding films).

As shown in FIG. 12c, the conventional micro-lens array sheet has a transparent plastic layer, a plastic layer 18 filled with light diffusive agent, and black stripe coatings (light shielding film) 13. The parallel beam light 16 is launched into the convex lens portion as the incident light, and then it makes a focus inside the lenticular sheet. Then the light diffuses in the plastic layer 18 filled with the light diffusive agent on the light transmitting side of the convex lens.

Here, the convex lens on the incident side is bigger than that of the light emitting side. This is for achieving a function not to deteriorate the light efficiency, in coping with the black stripe coatings (light shielding film) 13 for depressing the extraneous light reflection to the light emitting side. Further, the convex lens on both sides function to control the horizontal field angle, while the vertical field angle depends on the plastic layer 18 filled with the light diffusive agent.

As described above, both conventional single-sided lenticular screen and the double-sided lenticular screen covered with black stripes have strip-shaped lenses each elongating in the direction vertical to the viewer's eyes. The strip-shaped lenses control the horizontal field angle, but do not control the vertical field angle. Therefore, the vertical field angle is controlled by only the light diffusive agent. Thus, the vertical field angle is not sufficiently wide, which is undesirable. Further, both the horizontal and the vertical field angles are limited to the patterns only symmetrical in the vertical and the horizontal directions with respect to perpendiculars to the surface of the screen.

In addition, a typical problem of the conventional single-sided lenticular screen is that a tint-layer formed in the screen for depressing extraneous light reflection deteriorates the light efficiency of the emitting light to the incident light.

SUMMARY OF THE INVENTION

It is, therefore, an object of the present invention to provide a micro-lens array sheet having a wide field angle, a field angle control, a high light efficiency, a high brightness, and a high contrast. Another object of the present invention is to provide a projection type display apparatus provided with such a micro-lens array sheet.

For achieving the above objects, the micro-lens array sheet according to the present invention has a construction as follows.

According to a first aspect of the present invention, a micro-lens array sheet is provided with an array of micro-lenses each shaped in a centro-symmetry convex or concave and a layer of either a light diffusion sheet or a sheet filled with light diffusive agent which is attached on a light emitting side of the micro-lens array sheet, the micro-lenses are aligned in a diamond grid array.

According to a second aspect of the present invention, the micro-lenses are aligned in a grid of a combination of diamond blocks and hexagonal blocks.

According to a third aspect of the present invention, the cycle of the arrangement of the micro-lenses are different in the horizontal direction and in the vertical direction.

According to a fourth aspect of the present invention, the centers of the centro-symmetry micro-lenses are shifted.

According to the above aspect of the present invention, it is able to achieve a wide field angle, a control of the field angle, i.e., asymmetrical controls of the vertical and the horizontal field angles and a high brightness. Further, the micro-lens array sheet according to the present invention is able to achieve the high light efficiency and the high contrast by the courtesy of forming a light shielding film which does not depress the light transmittancy of the light emitting side of the sheet.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 3a is a plan view showing an example of a micro-lens array, according to the present invention;

FIG. 3b is a plan view showing a light shielding film to be attached to the micro-lens array of FIG. 3a;

FIG. 4a is a plan view showing another example of a micro-lens array, according to the present invention;

FIG. 4b is a plan view showing a light shielding film to be attached to the micro-lens array of FIG. 4a;

FIG. 5b is a plan view showing a light shielding film to be attached to the micro-lens array of FIG. 5a;

DESCRIPTION OF THE PREFERRED EMBODIMENTS

The present invention will be described in detail with reference to the appended drawings FIGS. 1 through 10.

Figure 1:
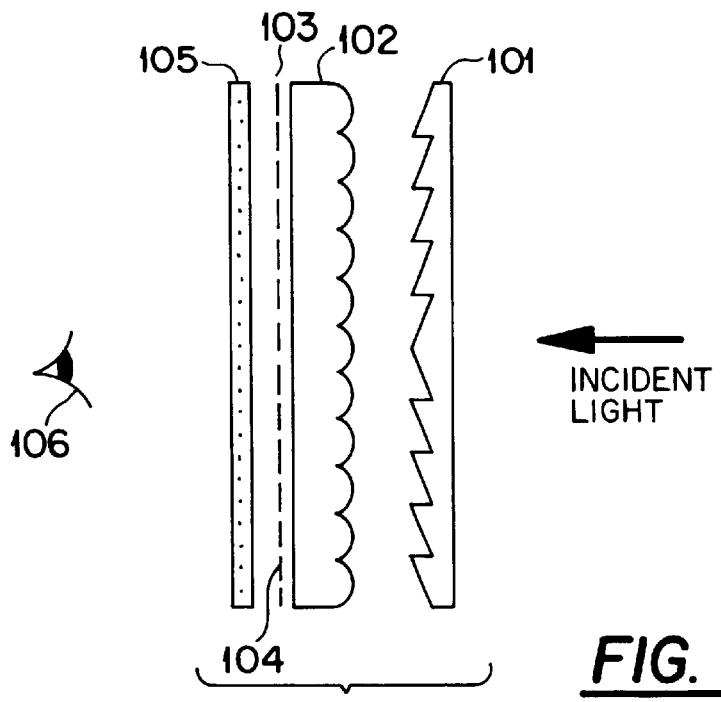
FIG. 1 is a section showing a first embodiment of a micro-lens array sheet according to the present invention.

FIG. 1 shows a first embodiment of the present invention.

In FIG. 1, the screen is constructed in order from a light incident side by a Fresnel lens sheet 101, a sheet shaped micro-lens array sheet 102, a light shielding film 103, and a light diffusion sheet 105.

The Fresnel lens sheet 101 converts a divergent light beam to a parallel light beam. The micro-lens array sheet 102 makes the parallel light beam come into a focus at the light emitting or transmitting side. The light passing through an opening 104 defined in the light shielding film 103 reaches to the user's eye 106 as a light with a given field angle converted by the light diffusion sheet 105. The openings 104 defined in the light shielding film 103 face toward the micro-lenses respectively.

The micro-lens screen has a specified construction as described in detail below.

Figure 2:
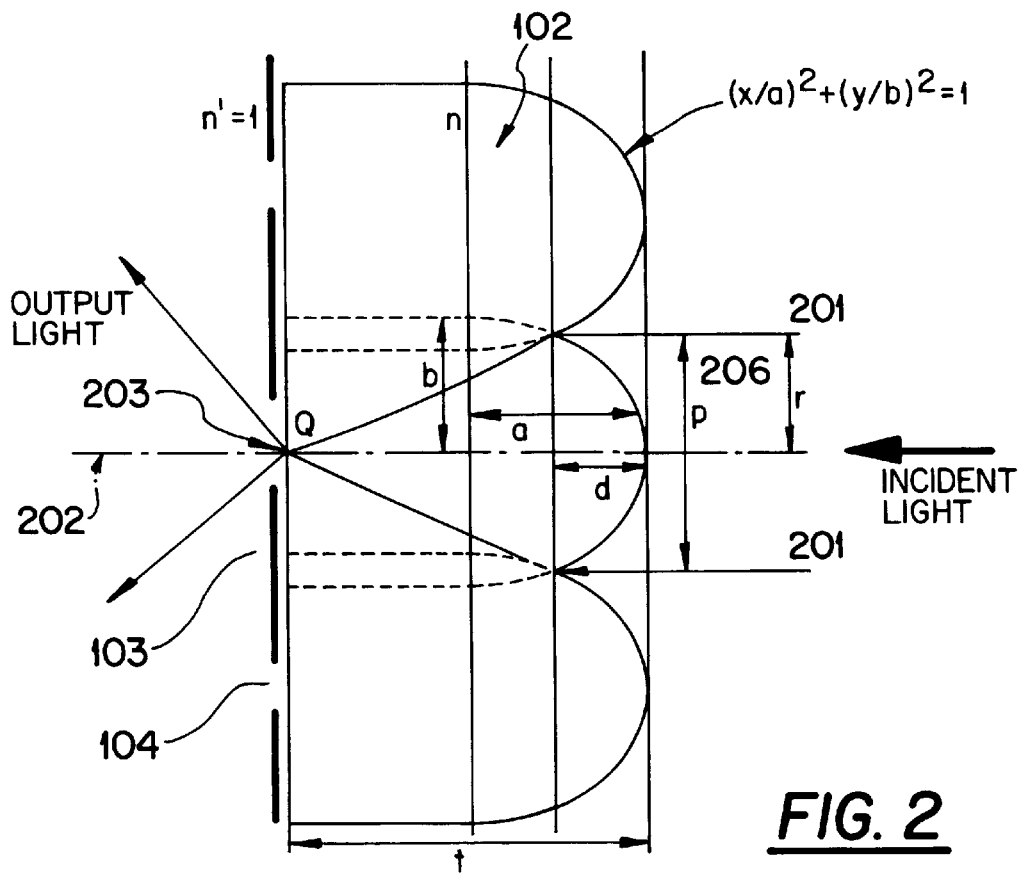
FIG. 2 is an enlarged section showing a fundamental portion of the first embodiment.

FIG. 2 shows a section of the enlarged micro-lens array sheet 102, the light shielding film 103, and its openings 104.

Each of the micro-lenses is of an oval aberration-free lens having a lens function designed so as to focus on the point of Q 203. The shape of the oval lens is given by the following equation.

$$(x/a)^2+(y/b)^2=1.$$

This equation represents that the oval lens is the convex lens centro-symmetric with respect to the x axis 202. The parallel beam light 201 is launched into the oval convex lens, where its focal point is taken at the point Q, represented by reference numeral 203, and then the light with some light diffusion angle is emitted through the openings 104. Further, since the light shielding film 103 depresses the external reflection so as to display a high contrast image even in a lighted room, the size of the openings 104 will be minimal. Also, the light shielding film 103 will be maximal to increase the quality of the screen.

The dimensions a and b represent a long radius and a short radius of the oval equation. The dimension d represents a distance between the boundary of the convex lenses and the top. The dimension r represents a distance between the x axis and the convex lens boundary. The dimension p represents the pitch of the convex lenses. The dimension t represents the thickness of the whole sheet of the micro-lens array sheet 102.

The micro-lens array sheet comprises an array of micro-lenses each shaped in a centro-symmetric concave or convex to focus the incident light in a specified direction on a predetermined position, and the light shielding film 103 not depressing the transmittancy of the incident light on the light emitting side was explained above, The micro-lens array sheet having the lens array sheet 102 and the shielding film 103 is able to achieve a high light efficiency, a high brightness and a high contrast by improving the external reflection characteristics without depressing the transmittancy of the incident light.

The micro-lens array sheet 102 will be explained in more detail herein-below.

FIGS. 3a and 3b show a diamond-shaped micro-lens viewed from its incident surface. The micro-lens in this embodiment is shaped in a diamond-shaped convex lens which is orthogonal to the optical axis of the lenses, as shown in FIG. 3a, in a circle in radius b which equals to the short axis of the oval equation.

FIG. 3b shows the focal point of the lens, as shown in FIG. 3a, which is viewed from the light emitting side. The light shielding film 103 and the openings 104 are designed, as shown in the drawings.

According to the micro-lens array sheet 102, the diamond-shaped micro-lens of this embodiment is able to increase the central brightness several times higher than that of the micro-lens with a rectangular shape when they have a same condition in their pitches in the H direction and the V direction, even though the horizontal and the vertical field angles are the same.

Figure 5A:
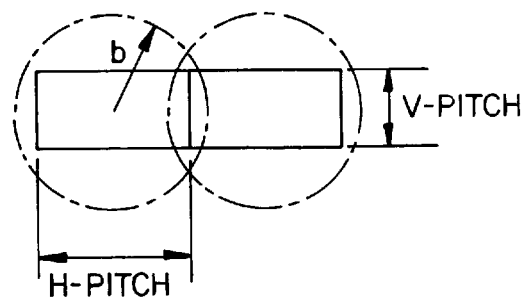
FIG. 5a is a plan view showing an array of micro-lenses of a comparative prior art.
Figure 5B:
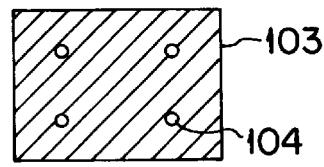

This is because that the rectangular-shaped micro-lens sheet emits a needless or superfluous light according to its diagonal field angle being widest in the screen (see FIG. 5).

The present invention is not limited to the embodiments as mentioned above.

FIG. 4a is a front view showing the combination of the diamond and hexagon micro-lenses viewed from the incident light surface.

FIG. 4b is a front view showing it viewed from the light emitting side. The light shielding film 103 and the openings 104 are designed, as shown in the drawing.

In the micro-lens array sheet 102, the diamond-shaped micro-lens screen has the most narrow field angle in the diagonal direction between the horizontal and the vertical field angles. So, to make diagonal field angle wider than that of the diamond-shaped micro-lens, hexagon lenses are used together.

According to the diamond-shaped micro-lens array, by changing the pitches in the H direction and the V direction, the difference of the horizontal and the vertical field angle can be arbitrarily set up. That is, by changing the pitches in the H and the V directions of the aberration-free oval lenses the horizontal and the vertical field angles can be easily set up.

The present invention is not limited to the embodiment as mentioned above.

Figure 6:
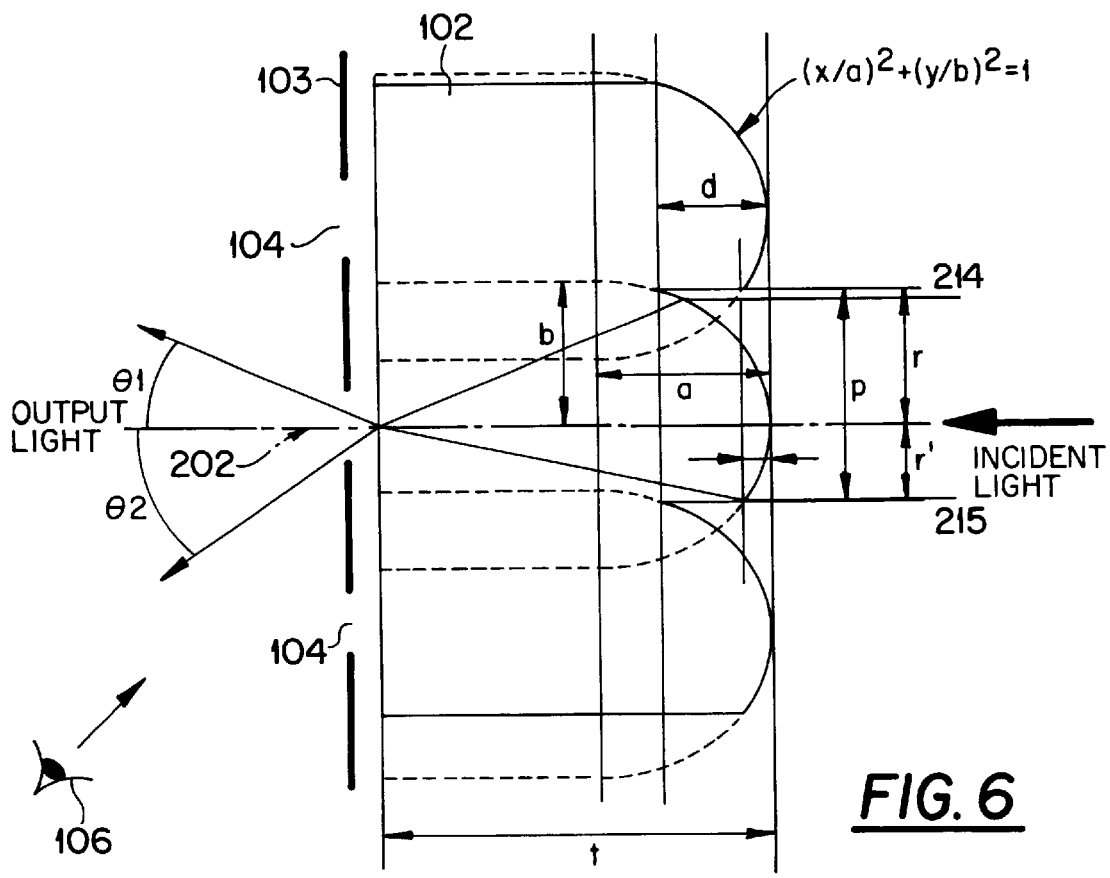
FIG. 6 is an enlarged section showing another example of the fundamental portion of the first embodiment.

FIG. 6 is a section showing the screen.

As shown in FIG. 6, the micro-lens array is basically the same as the micro-lens array sheet 102, as shown in FIG. 2. However, each micro-lens is shaped into a semi-oval in which its centro-symmetric axis, i.e., the x-axis 202 departs from its boundary with one adjacent lens by a distance r and also from its other boundary with the other adjacent lens by a distance r', so as to cut a portion of the micro-lens exceeding the distance r'. Accordingly, for instance as the screen efficiency, the vertical field angle can be changed, and the horizontal field angle can be bilaterally symmetrical. And as the optically, the lights 214 and 215 take focus on the point Q 203 of the micro-lens and emit as the lights having the angles θ1 and θ2 to the axis 202. So that, since the angles θ1 and θ2 are related to each other in an inequality; θ1<θ2, the vertical field angle can be made asymmetrical.

According to the construction as mentioned above, the horizontal field angle of the rear projecting display apparatus is made to have a bilateral symmetric wide field angle, while the vertical field angle of the rear projecting display apparatus is made vertically asymmetrical so as to have a wide upper field angle and a narrow lower field angle. Further, by reducing the field angle direction which has no problem to the actual usage, the central brightness is improved more than field angles symmetric in the vertical and the horizontal directions. In this case, the rear projection type display apparatus serves a good display of images when it is rested a higher position than the viewer's eyes.

The component like those of the micro-lens array in FIG. 2 are assigned with same reference numerals.

By providing the light diffusion sheet 105 on the light emitting side of the micro-lens array sheet 102, as shown in FIG. 1, following functions can be achieved. That is, it is able to spread out further the field angle more than the ordinal field angle of the micro-lens array.

The present invention is not limited to the above-mentioned first embodiment.

Figure 7:
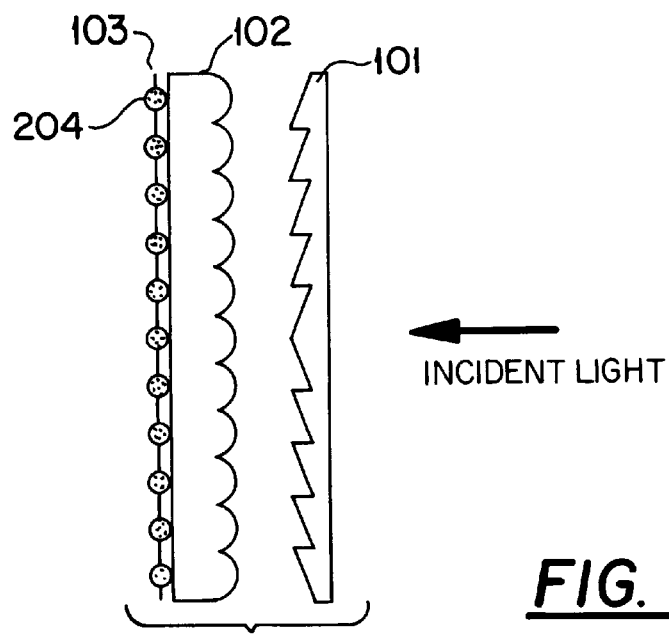
FIG. 7 is a section showing a second embodiment of a micro-lens array sheet according to the present invention.

FIG. 7 shows another embodiment of the present invention. This second embodiment is substantially similar to the first embodiment, as shown in FIG. 1. However, this second embodiment is different from the first embodiment in that it is provided with light diffusive agents 204 in the openings 104 defined on the light shielding film 103, in place of the light diffusion sheet 105, as shown in FIG. 1. Accordingly, components having similar functions to those in the first embodiment of FIG. 1 are numbered with the same reference numbers.

In the construction as described above, the field angle is auxiliarily spread out at the openings which actually serve optical functions. Further, in the case that the extraneous light reflection has a very strong affection, it is able to reduce the affection of the extraneous light reflection so as to achieve the high contrast, in keeping the field angle as it is.

Further, it is needless to say that the micro-lens array sheet 102 can take any one of the embodiments as mentioned above.

FIG. 8 shows one example of the methods for fabricating a sheet combining the micro-lens array sheet 102 and the light shielding film 103 together.

Figure 8A:
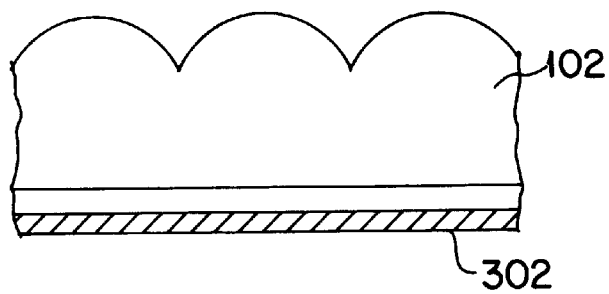
FIGS. 8a and 8b are drawings for explaining steps of fabricating openings in the light shielding film, according to the present invention.
Figure 8B:
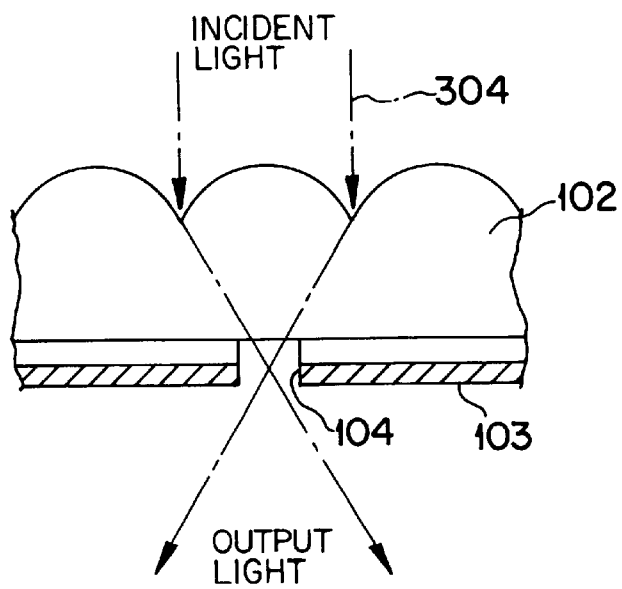
Figure 9:
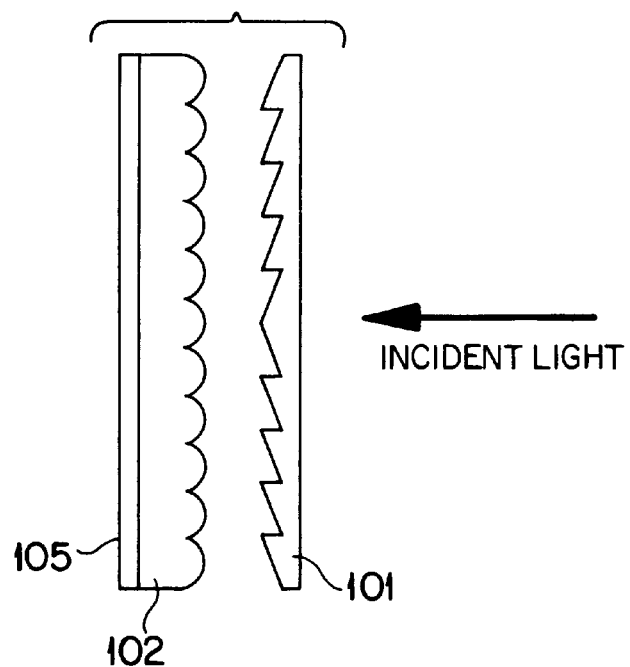
FIG. 9 is a section showing a portion of a third embodiment of a micro-lens array sheet according to the present invention.

In FIGS. 8a and 8b, for forming the light shielding film 103 and the openings 104 by using the micro-lens array sheet 102, the light shield sheet 302 is adhered or coated on the light emitting side of the micro-lens array sheet 102 as shown in FIG. 8a. Subsequently, likely to the incident light 304 which is actually used as shown in FIG. 8b, the vertical light to the micro-lens array sheet 102 is launched into the light shielding film 302 through the lens so as to hollow out the light shielding film 302. As a result, the openings 104 are formed. This is so called as a self-alignment system. In this micro-lens array sheet 102, it is essential to make the incident light 304 a focus on the light emitting side.

Accordingly, the above construction can achieve a suitable field angle without depressing the transmittancy of the incident light, and also a high contrast which is hardly affected by the extraneous light reflection.

The present invention is not limited to the embodiments mentioned above, as these embodiments are meant to be examples and not limiting to the broadest principles of the present invention.

FIG. 10 shows another embodiment of the micro-lens array sheet in which a light shielding film and openings are omitted for the sake of clarity. Other components the same as those of the above-described embodiments are assigned with same reference numerals and are not discussed below.

Figures 10A, 10B:
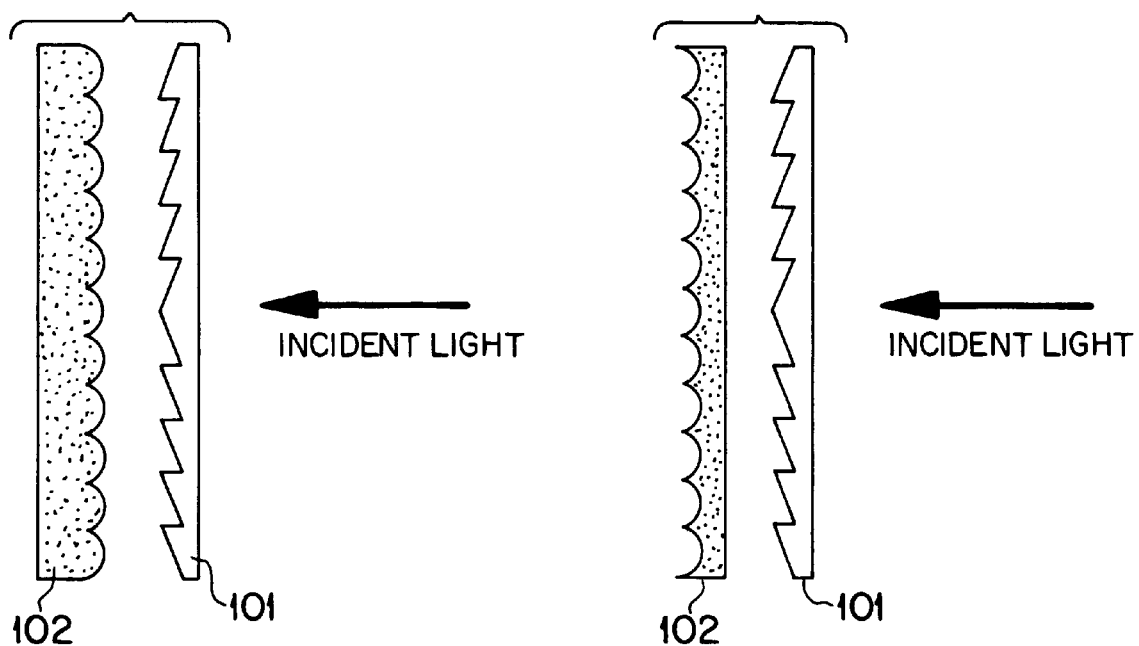
FIG. 10a is a section showing a portion of a fourth embodiment of a micro-lens array sheet according to the present invention.
FIG. 10b is a section showing a portion of a fifth embodiment of a micro-lens array sheet according to the present invention.
Figure 11A:
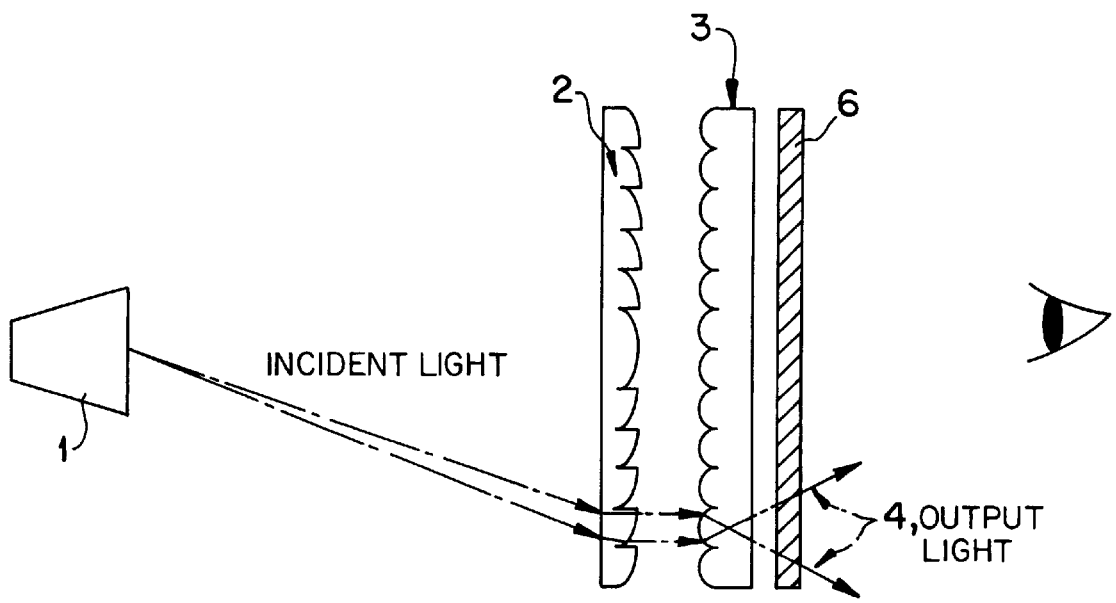
FIGS. 11a, 11b and 11c are a set of drawings showing a conventional rear projection type image display apparatus.
Figure 11B:
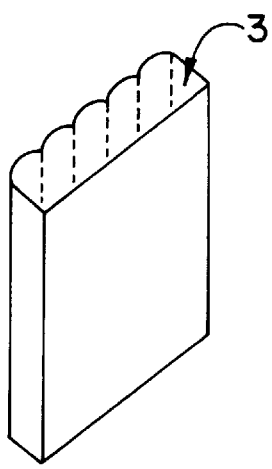
Figure 11C:
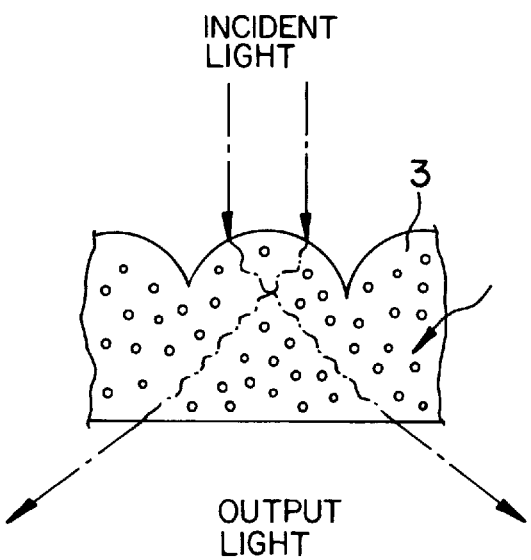
Figure 12A:
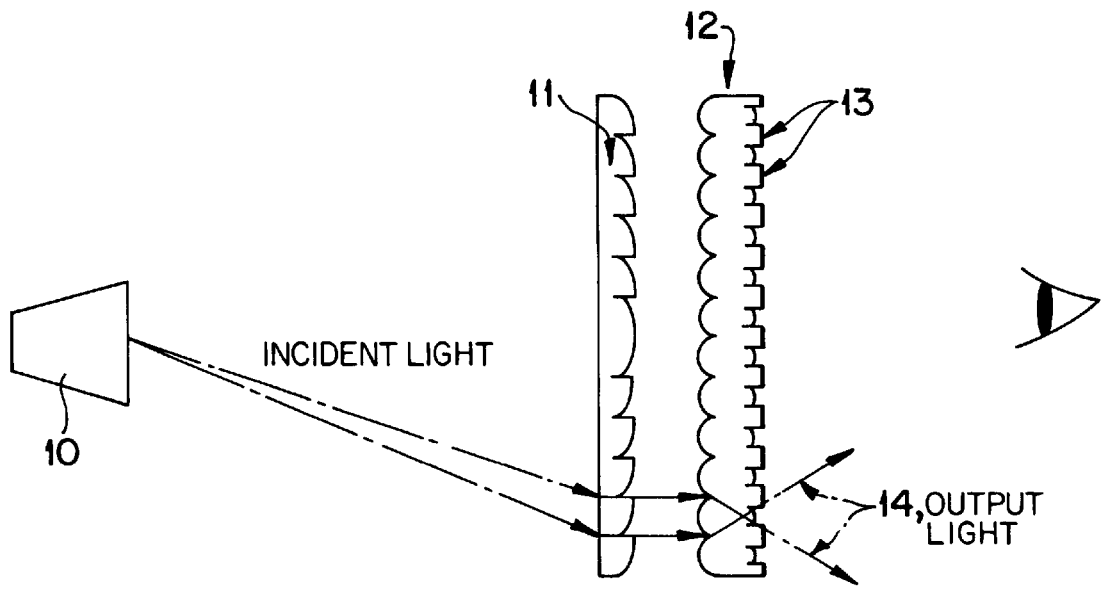
FIGS. 12a, 12b and 12c are a set of drawings showing another conventional rear projection type image display apparatus.
Figure 12B:
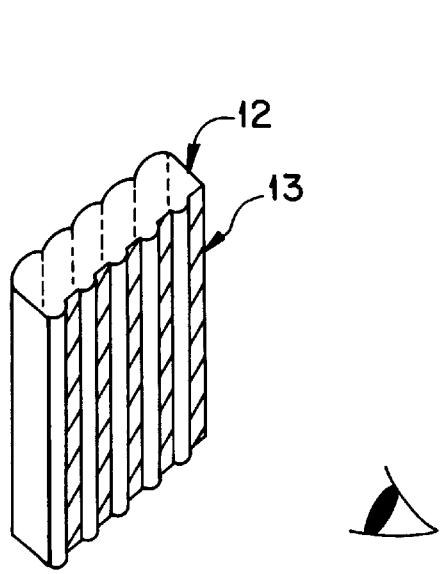
Figure 12C:
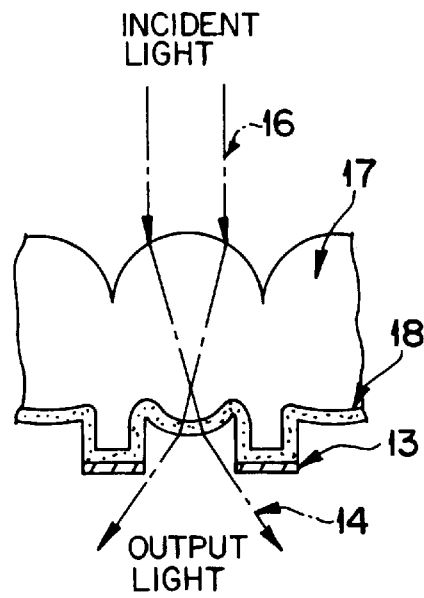

FIG. 10a depicts a micro-lens array sheet 102 filled therein a light diffusive agent. In this embodiment, portions the same as that of the above embodiments are assigned with same reference numerals, and are also not discussed below.

In the embodiment, the field angle is also controlled by modifying the shape of the micro-lens.

A suitable light shielding film and openings may be added to the micro-lens array sheet 102, as shown in FIG. 10a.

Further, in the embodiment of FIG. 10a the micro-lenses 102 are shaped convex. However they may be shaped concave, as shown in FIG. 10b.

As described above, the present invention can provide an extremely preferable micro-lens array sheet suitable for wide screen display apparatus of the rear projection type television. That is, the micro-lens array sheet according to the present invention is able to achieve a wide field angle, a control of the field angle (horizontal and vertical asymmetrical control), a high brightness, a high light efficiency and a high contrast.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefor, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A micro-lens array sheet having a light incident surface and a light transmitting surface disposed opposite to the light incident surface, the micro-lens array sheet comprising:
   a plurality of micro-lenses formed on the light-incident surface, each micro-lens having a centro-symmetry convex or concave shape,
   the plurality of micro-lenses being configured to carry a light diffusion element provided on the light transmitting surface of the micro-lens array sheet, the light diffusion element being configured to diffuse light emitted from the plurality of micro-lenses, and
   wherein the plurality of micro-lenses are arrayed in a diamond-shape block.

2. A micro-lens array sheet according to claim 1, wherein the light diffusion element is a light diffusion sheet provided on the light transmitting surface of the array.

3. A micro-lens array sheet according to claim 1, wherein the light diffusion element is a light diffusive agent dispersed in the plurality of micro-lenses.

4. A micro-lens array sheet having a light incident surface and a light transmitting surface disposed opposite to the light incident surface, the micro-lens array sheet comprising:
   a plurality of micro-lenses formed on the light-incident surface, each micro-lens having a centro-symmetry convex or concave shape,
   the plurality of micro-lenses being configured to carry a light diffusion element provided on the light transmitting surface of the micro-lens array sheet, the light diffusion element being configured to diffuse light emitted from the plurality of micro-lenses, and
   wherein the plurality of micro-lenses are arrayed in a combination of diamond-shape micro-lens blocks and hexagonal-shape micro-lens blocks.

5. A micro-lens array sheet according to claim 4, wherein the light diffusion element is a light diffusion sheet provided on the light transmitting surface of the array.

6. A micro-lens array sheet according to claim 4, wherein the light diffusion element is a light diffusive agent dispersed in the plurality of micro-lenses.

7. A display screen for use in a rear projection type video display apparatus comprising:
   a micro-lens array sheet having a light incident surface and a light transmitting surface disposed opposite to the light incident surface, the micro-lens array sheet comprising
   a plurality of micro-lenses formed on the light-incident surface, each micro-lens having a centro-symmetry convex or concave shape, the micro-lens array being configured to carry a light diffusion element provided on the light transmitting surface of the plurality of micro-lenses, the light diffusion element being configured to diffuse light emitted from the plurality of micro-lenses,
   wherein the micro-lenses are arrayed in one of a diamond-shape block and a combination of diamond-shape micro-lens blocks and hexagonal-shape micro-lens blocks.

8. A display screen according to claim 7, wherein the plurality of micro-lenses has a horizontal aligning pitch that is different from the vertical aligning pitch thereof.

9. A display screen according to claim 7, wherein the plurality of micro-lenses are configured to have a semi-oval asymmetrical configuration along a horizontal axis thereof so as to provide different vertical field angles between an upward direction and a downward direction.

10. A display screen according to any one of claims 7–8 further comprising a light shielding layer provided on the light transmitting surface of the micro-lens array sheet, the light shielding layer having openings facing the plurality of micro-lenses and being configured to emit light incident to the micro-lenses through the openings.

11. A projection type video display apparatus comprising:
    a video generator configured to generate video data; and
    a display screen configured to display the video data thereon, the display screen including a micro-lens array sheet having a light incident surface and a light transmitting surface disposed opposite to the light incident surface, the micro-lens array sheet comprising
    a plurality of micro-lenses formed on the light-incident surface, each micro-lens having a centro-symmetry convex or concave shape, the plurality of micro-lenses being configured to carry a light diffusion element provided on the light transmitting surface of the array and configured to diffuse light emitted from the plurality of micro-lenses,
    wherein the micro-lenses are arrayed in one of a diamond-shape block and a combination of diamond-shape micro-lens blocks and hexagonal-shape micro-lens blocks.

\* \* \* \* \*